United States Patent

[11] 3,590,384

[72] Inventor Petrus Josephus van Gerwen
Emmasingel, Eindhoven, Netherlands

[21] Appl. No. 762,023
[22] Filed Sept. 24, 1968
[45] Patented June 29, 1971
[73] Assignee U.S. Philips Corporation
New York, N.Y.
[32] Priority Oct. 7, 1967
[33] Netherlands
[31] 6713667

[54] SYNCHRONOUS PULSE TRANSMISSION SYSTEM WITH SELECTABLE MODULATION MODE
4 Claims, 1 Drawing Fig.

[52] U.S. Cl. .......... 325/141, 325/38, 332/10
[51] Int. Cl. .......... H04b 1/04
[50] Field of Search .......... 332/1, 10; 325/38, 40, 43, 44, 45, 61, 139, 141

[56] References Cited
UNITED STATES PATENTS

| | | | |
|---|---|---|---|
| 3,406,343 | 10/1968 | Mehlman .......... | 325/40 |
| 3,467,777 | 9/1969 | Rumble .......... | 178/67 |

*Primary Examiner*—Robert L. Richardson
*Attorney*—Frank R. Trifari

ABSTRACT: A modulator for modulating a digital carrier with digital information pulses features logic gates, inverters and a switch. The switch has three positions for connecting the circuit into three different configurations for achieving AM, FM and PM. A digital filter is used in conjunction with the modulator for attenuating any possible undesired sidebands resulting from the modulation.

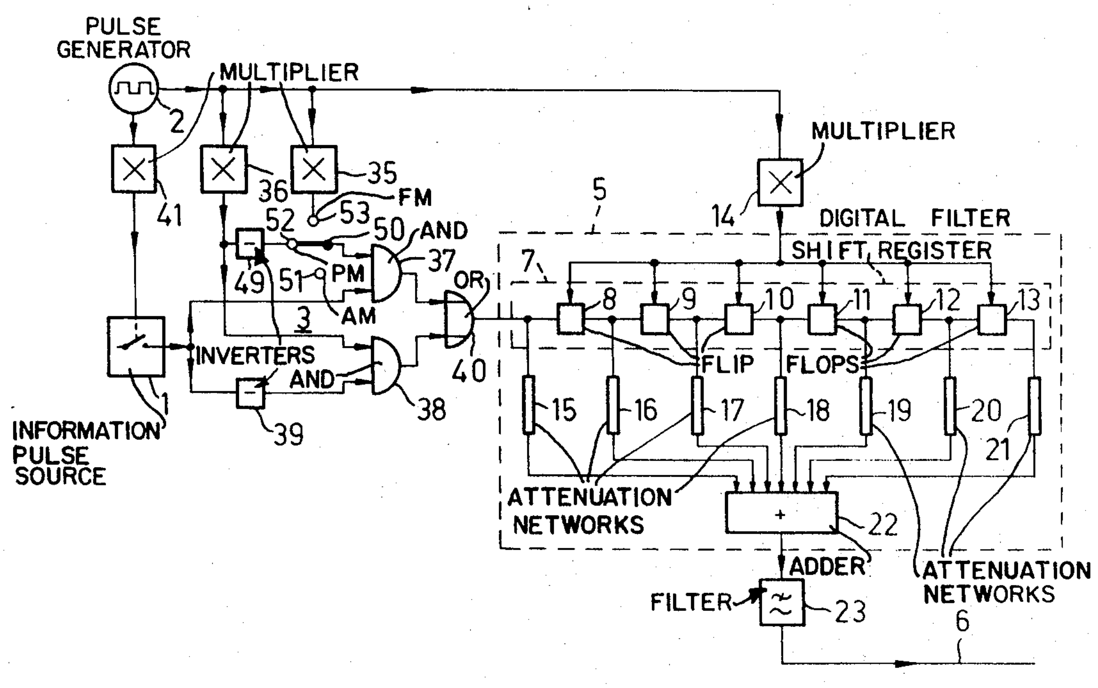
INVENTOR.
PETRUS J. van GERWEN
BY
Frank R. Trifari
AGENT

SYNCHRONOUS PULSE TRANSMISSION SYSTEM WITH SELECTABLE MODULATION MODE

A prior U.S. application Ser. No. 728,706, filed May 13, 1968, describes a device for the transmission of synchronous pulse signals comprising a source for pulse the instants of occurrence of which coincide with a series of equidistant clock pulses, a switching modulating device controlled by a carrier oscillator and an output filter.

As is extensively described in the said application a particularly flexible device for the transmission of synchronous pulse signals is obtained in which it is possible, without modifications in structure, to adjust at different speeds of transmission, different frequency location of the information band within an allotted transmission channel and different methods of modulation, in that the output filter is formed by a digital filter including a shift register having a number of shift register elements the contents of which are shifted under the control of a shift pulse generator, the shift frequency of the shift pulse generator, the carrier frequency of the carrier oscillator and the clock frequency of the synchronous pulse signals being derived from a single central pulse generator.

An object of the invention is to provide a device of the kind described for the transmission of synchronous pulse signals which device can be adjusted to amplitude, frequency or phase modulation by one switch only and which is especially suitable for a simple design as an integrated circuit due to its entirely digital structure.

The device according to the invention is characterized in that the switching modulating device is formed by two AND gates the outputs of which are connected through an OR gate to the digital filter, the pulses originating from the pulse source being applied to the two AND gates through supply lines one of which is provided with an inverter, and also a first carrier oscillation derived from the central pulse generator being applied to the two AND gates through carrier supply lines one of which is provided with an inverter and one of which is provided with a switch having a rest contact and two make contacts, the first carrier oscillation derived from the central pulse generator being applied to one make contact and a second carrier oscillation likewise derived from the central pulse generator being applied to the other make contact.

In order that the invention may be readily carried into effect, it will now be described in detail by way of example with reference to the accompanying diagrammatic drawing.

The FIGURE shows a device for the transmission of bivalent synchronous pulse signals in a prescribed frequency band of, for example, 300—3000 c./s. at a speed of transmission of, for example, 600 Baud. By "bivalent" is meant pulses which have only two permissible voltage levels, e.g. 1 and 0 volts. The bivalent pulses which originate from a pulse source 1 and the instants of occurrence of which coincide with a series of equidistant clock pulses which are derived from a clock pulse generator 41 are applied as modulation signals to a switching modulating device 3 in order to modulate therein a carrier oscillation originating from a carrier oscillator 36. In the embodiment described the clock pulse generator 41 and the carrier oscillator 36 are both formed by an astable multivibrator, while the clock frequency $f_b$ is 600 c./s. and the carrier frequency $f_c$ is, for example, 1800 c./s. The modulated signals are passed on for further transmission to a transmission line 6 through an output filter 5.

In order to obtain a particularly flexible transmission device the output filter in accordance with the said application is formed by a digital filter including a shift register 7 having a number of shift register elements 8, 9, 10, 11, 12, 13 the contents of which are shifted under the control of a shift pulse generator 14, the shift frequency $f_d$ of the shift pulse generator 14, the carrier frequency $f_c$ of the carrier oscillator 36 and the clock frequency $f_b$ of the clock pulse generator 41 being derived from a single central pulse generator 2.

In the embodiment shown the shift pulse generator 14 is also formed by an astable multivibrator which supplies shift pulses to the shift register 7 at a frequency $f_d$ of, for example, 7200 c./s. The central pulse generator 2 supplies pulses at a repetition frequency $f_o$ of, for example, 300 c./s which are used for synchronization of the clock pulse generator 41, carrier oscillator 36 and of shift pulse generator 14 all constructed as a multivibrator so that the clock frequency $f_b$, the carrier frequency $f_c$ and the shift frequency $f_d$ are derived from the frequency $f_o$ of the central pulse generator 2 by means of frequency multiplication by factors 2, 6 and 24, respectively, in the astable multivibrators 41, 36 and 14 acting as frequency multipliers. Furthermore, the shift register elements 8, 9 10, 11, 12, 13 in the digital filter 5 are connected through adjustable attenuation networks 15, 16, 17, 18, 19, 20, 21 to a combination device 22 from which the output signals of the transmission device are derived. In this embodiment the shift register 7 includes, for example, a plurality of bistable triggers.

With the aid of the digital filter 5, a desired transfer function of the transmission device is obtained by suitably dimensioning the transfer coefficients $C'_3$, $C'_2$, $C'_1$, $C_0$, $C_1$, $C_2$, $C_3$ of the attenuation networks 15, 16, 17, 18, 19, 20, 21 at a certain shift period $d=1/f_d$. The said application shows mathematically that a transfer function is obtained the amplitude-frequency characteristic $\psi(\omega)$ of which the shape of:

$$\psi(\omega)=C_o+\sum_{k=1}^{N} 2C_k \cos k\omega\alpha$$

and the phase-frequency characteristic $\Phi(\omega)$ shows a purely linear variation in accordance with:

$$\Phi(\omega)=-N\omega d.$$

in the case of 2N shift register elements and attenuation networks which are pairwise equal starting from the ends of the shift register 7, the transfer coefficients $C_k$ satisfying the expression:

$C'_k=C_k$ for $k=1, 2, \ldots, N$. The amplitude-frequency characteristic thus forms a Fourier series developed in cosine terms the periodicity $\Omega$ of which is given by:

$$\Omega d=2\pi.$$

If a certain amplitude-frequency characteristic $\psi(\omega)$ is to be obtained the coefficients $C_k$ in the Fourier series can be determined with the aid of the expression:

$$C_k=(1/\Omega)\cdot\int_0^{\Omega}\Psi(\omega)\cos k\omega d\cdot d\omega.$$

The shape of the amplitude-frequency characteristic is fully determined thereby, but the result of the periodical behavior of the Fourier series is that the desired amplitude-frequency characteristic is repeated at a periodicity $\Omega$ in the frequency spectrum, thus creating additional pass regions of the transmission device, Said additional pass regions are not disturbing in practice, since in case of sufficiently high value of the periodicity $\Omega$ which means: at a sufficiently small value of the shift period $d$. the frequency distance between the desired pass region and the subsequent additional pass region is sufficiently large so that said additional pass regions can be suppressed by a simple suppression filter 23 at the output of the combination device 22 without influencing in any way the amplitude-frequency characteristic and the linearity of the phase-frequency characteristic in the desired pass region. The suppression filter 23 is formed, for example, by a lowpass filter consisting of a resistor and a capacitor.

A substantial extension of the applications is obtained in that the inverted pulse signals are derived from the shift register elements, which inverted pulses signals also appear at the bistable triggers if the shift register elements are constructed with bistable triggers. This it becomes possible to obtain negative coefficients $C_k$ in the Fourier series. Furthermore this permits an amplitude-frequency characteristic $\psi(\omega)$ in the shape of a Fourier series developed in sine terms with a linear phase-frequency characteristic. To this end the attenuation networks are again pairwise equal starting from the ends of the shift register 7, but the central attenuation network 18 has a transfer coefficient $C_o$ equal to zero and the inverted pulse signal is applied to the attenuation networks succeeding the attenuation network 18 so that a number 2N of shift register elements the transfer coefficients satisfy the expression: $C'_k = 'C_k$ for $k=1, 2 \ldots N$. For the transfer function then applies that $$\psi(\omega) = \sum_{k=1}^{N} 2C_k \sin k\omega d$$

$$\Phi(\omega) = -N\omega d + \pi/2$$

in which the coefficients $C_k$ in the Fourier series can be determined from the relation:

$$C_k = (1/\Omega) \cdot \int_0^{\Omega} \Psi(\omega) \sin k\omega d \cdot d\omega.$$

By suitable choice of the transfer coefficients of the attenuation networks any arbitrary amplitude-frequency characteristic can be obtained in this manner with a linear phase-frequency characteristic so that the modulated pulse signals applied to the digital filter 5 may be filtered in any desired manner without introducing phase distortion.

Thus the digital filter 5 can be given that transfer function which is desired for various methods of modulation, for example, that of a filter with two sidebands on either side of the carrier frequency, with a sideband and a vestigial sideband or with a single sideband. Once the transfer function is adjusted, for example, to an optimum recovering of the original pulse signals, this optimum adjustment is retained also with varying operating conditions such as variations of the frequency $f_o$ of the central pulse generator 2 as a result of the congruent variation of the transfer function with the frequency $f_o$, that is to say, if $f_o$ changes by a certain factor both the clock frequency $f_b$, the carrier frequency $f_c$ and the shift frequency $f_d$ change by the same factor with the result that on a frequency scale changed by the same factor the amplitude-frequency characteristic retains its original shape and also the phase-frequency characteristic retains its linear variation.

The said application extensively describes how in the arrangement of the transmission device for various methods of transmission in which the switching modulating device 3 is constructed as an amplitude modulator phase modulator or frequency modulator and the digital filter 5 is constructed as a double sideband filter, vestigial sideband filter or single sideband filter, the original pulse signals can be recovered from the pulse signals transmitted with the aid of these various methods of transmission always independently of the method if transmission used and by means of the same, remarkably simple receiving device, when the mutual ratio of the clock frequency $f_b$, the carrier frequency $f_c$ and the shift frequency $f_d$ is always an integer.

Together with this flexibility of the method of transmission the transmission device furthermore permits adjustments in the speed of transmission or the location of the information band within the allotted transmission channel, while maintaining the structure of the said system, by adjusting the frequency multiplication factor of the frequency multiplier 41 and the frequency multiplier 36, respectively, and suitably dimensioning the attenuation networks 15—21.

Because of the special flexibility in the choice of the method of transmission, the speed of transmission and the location of the information band within a transmission channel, the transmission device can readily be adapted in an optimum manner to the properties of the allotted transmission channel, transmission conditions once adjusted in an optimum manner also being maintained at varying operating conditions.

In order to enable such a flexible transmission device to be adjusted to amplitude, frequency or phase modulation, by only one switch the switching modulating device 3 is formed according to the invention by two AND gates 37, 38 the outputs of which are connected through an OR gate 40 to the digital filter 5, the pulses originating from the pulse source 1 being applied to the two AND gates 37, 38 through supply lines one of which is provided with an inverter 39, and also a first carrier oscillation derived from the central pulse generator 2 is applied to the two AND gates 37, 38 through carrier supply lines one of which is provided with an inverter 49 and one of which is provided with a switch 50 having a rest contact 51 and two make contacts 52, 53, the first carrier oscillation derived from the central pulse generator 2 being applied to a make contact 52 and a second carrier oscillation likewise derived from the central pulse generator 2 being applied to the other make contact 53.

In the embodiment shown the inverter 39 is included in the supply line towards the AND gate 38, while both the inverter 49 and the switch 50 are included in the carrier supply line towards the AND gate 37. The switching of the switch 50 is directly connected to an input of the AND gate 37 while the first carrier oscillation of a frequency $f_c1$ of, for example, 1800 c./s. is derived from the central pulse generator 2 with the aid of the frequency multiplier 36 and the second carrier oscillation of a frequency $f_c2$ of, for example, 1200 c./s. is derived from the central pulse generator 2 with the aid of a frequency multiplier 35.

The operation of the transmission device according to the invention will now further be described.

If the switching contact of the switch 50 engages the rest contact 51 the switching modulating device 3 acts as an amplitude modulator. Dependent on the presence or absence of a pulse in the bivalent pulse signals to be transmitted from the pulse source 1 the carrier oscillation of the frequency $f_{c1}$ originating from the carrier oscillator 36 is either applied or not applied through AND gate 38 and OR gate 40 to the digital filter 5.

If the switching contact of the switch 50 engages the make contact 52 the switching modulating device 3 acts as a phase modulator. Both in the presence and absence of a pulse in the bivalent pulse series to be transmitted from the pulse source 1 pulses of the carrier oscillation $f_{c1}$ occur at the output of OR gate 40, but in the absence of a pulse to be transmitted from pulse source 1 the carrier oscillation of the carrier oscillator 36 is directly applied through AND gate 38 and OR gate 40 to the digital filter 5, whereas in the presence of a pulse to be transmitted from pulse source 1 said carrier oscillation of the carrier oscillator 36 is applied through AND gate 37 and OR gate 40 to the digital filter 5 after having undergone an inversion in the inverter 49, that is to say, a phase shift of 180°. Thus a sudden phase change occurs in the carrier oscillation applied to the digital filter 5 at the transitions in the bivalent pulse series from the pulse source 1 so that said carrier oscillation is phase-modulated by the pulse series to be transmitted.

If the switching contact of the switch 50 engages the make contact 53 the switching modulating device 3 acts as a frequency modulator, the bivalent pulse series to be transmitted from the pulse source 1 being transmitted by means of "frequency shift keying." Dependent on whether a pulse is present or absent in the bivalent pulse series to be transmitted a carrier oscillation $f_{c2}$ of the carrier oscillator 35 is applied to the digital filter 5 through AND gate 37 and OR gate 40, or a carrier oscillation $f_{c1}$ of the carrier oscillator 36 is applied to the digital filter 5 through AND gate 38 and OR gate 40.

In this manner the transmission device according to the invention may be adjusted at will to amplitude modulation, phase modulation or frequency modulation by means of one switch only, said transmission device furthermore being very suitable for solid-state integration due to its entirely digital construction.

I claim:

1. A modulation device, comprising a source of digital information signals; first and second sources of digital carrier signals having different frequencies; a switch having a center contact and three positional contacts; one of said positional contacts being coupled to said second source of carrier signals; first and second AND gates, each having two inputs and one output; an OR gate having two inputs coupled to said AND gate outputs respectively and one output; one of said first AND gate inputs being coupled to said center contact; a first pair of conductors coupling said first carrier source to another of said positional contacts and one of said second AND gate inputs; a second pair of conductors coupling said information signal source to the remaining inputs of said AND gates; and first and second inverters coupled within one of said first and one of said second conductors.

2. A device as claimed in claim 1 wherein said first inverter is coupled within the conductor coupling said first carrier signal source and one said positional contacts, and said second inverter is coupled within the conductor coupling said information signals source to said remaining input of said second AND gate.

3. A device as claimed in claim 1 further comprising a pulse generator and wherein said information and carrier signal sources are synchronized with said pulse generator.

4. A device as claimed in claim 3 further comprising a digital filter including a shift register synchronized with said pulse generator.